United States Patent
Lecoeur

[15] 3,682,069
[45] Aug. 8, 1972

[54] INTERCHANGEABLE LENSES CAMERA MOUNTING

[72] Inventor: Jacques Lecoeur, Epinay sur Seine, France

[73] Assignee: Eclair International, Paris, France

[22] Filed: May 19, 1970

[21] Appl. No.: 38,673

[30] Foreign Application Priority Data

May 23, 1969 France.....................6917006

[52] U.S. Cl.........................95/44 R, 95/45, 350/257
[51] Int. Cl..............................................G03b 3/00
[58] Field of Search................95/44 R, 45; 350/257

[56] References Cited

UNITED STATES PATENTS

| | | | |
|---|---|---|---|
| 2,826,118 | 3/1958 | Suzukawa | 350/257 |
| 2,842,030 | 7/1958 | Geddes | 350/257 |
| 3,500,735 | 3/1970 | Mito | 95/44 |

*Primary Examiner*—Samuel S. Matthews
*Assistant Examiner*—E. M. Bero
*Attorney*—Robert E. Burns and Emmanuel J. Lobato

[57] ABSTRACT

A lens mount for a camera comprises an annular mounting member secured to the camera case and having an internally threaded aperture to receive a lens, an externally threaded rim portion and a plane front reference face. A mount for a heavier or larger lens, for example a zoom lens, comprises a flanged sleeve to receive the lens, an annular intermediate member in which the sleeve is secured and a fastening ring which is secured to the intermediate member by a centering and bearing member in such manner that the fastening ring is rotatable on the intermediate member and is axially slidable within limits. The fastening ring has an internally threaded inner end portion which screws onto the externally threaded rim of the mounting member to press the centering and bearing member tightly against the reference face of the mounting member.

7 Claims, 2 Drawing Figures

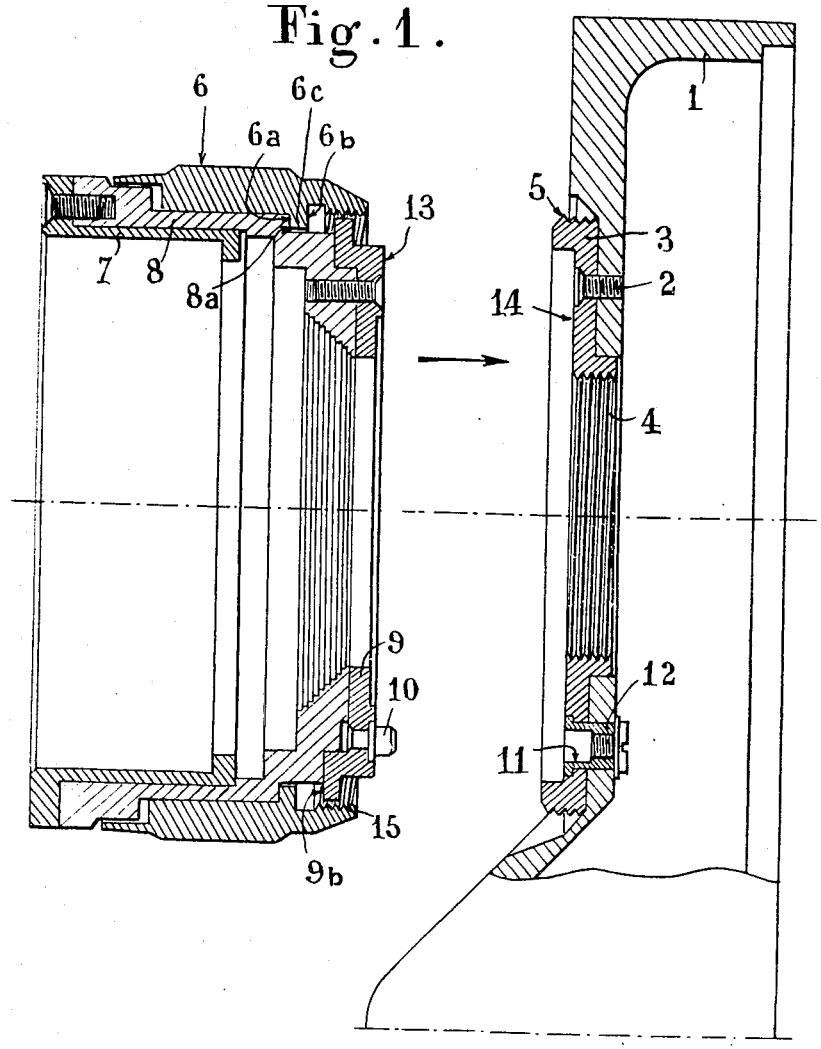

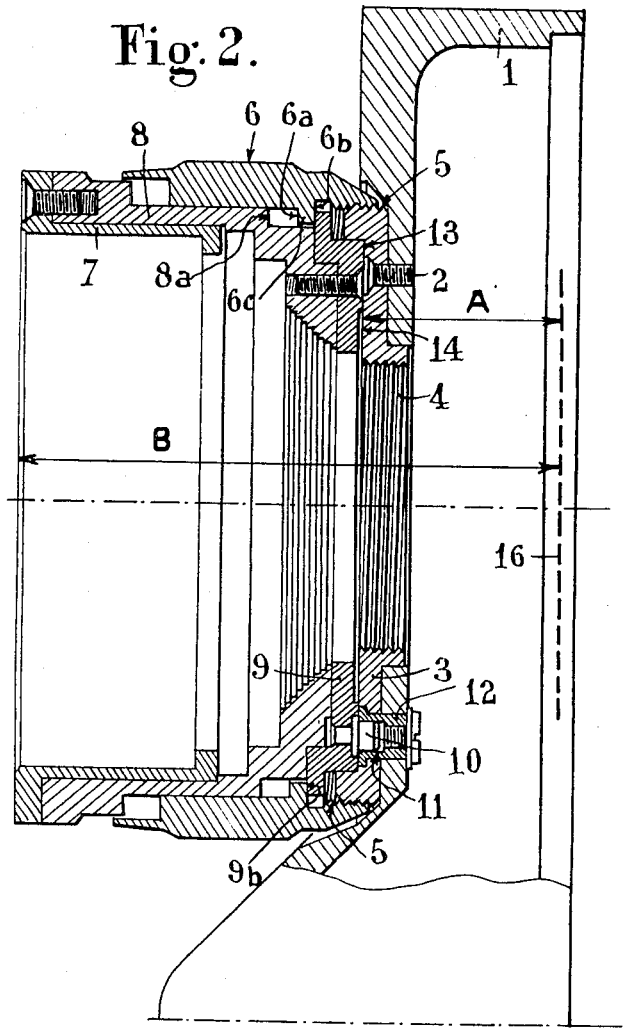

INTERCHANGEABLE LENSES CAMERA MOUNTING

BACKGROUND OF THE INVENTION

This invention relates in general to lens mountings for motion-picture cameras and has specific reference to a mounting permitting of quickly fitting interchangeable lenses notably to a 16-millimeter substandard camera.

As a rule, 16-millimeter sub-standard cameras are equipped with means permitting the fitting of lenses mounted in a standardized so-called "C-Mounting," of the essential characteristic is the provision of a screw-threaded male end having a diameter of 1 inch and a pitch of 32 threads per inch, with a bearing face being spaced 0.69 inch for 17.52 mm from the image plane or photosensitive film surface.

However, this mounting is intended chiefly for use in the amateur field in which its relative fragility and the risks of accidents when screwing in or out the interchangeable lenses are generally accepted ; in the profession field considerably more severe requirements must be met, for heavier lenses must be replaced rapidly with the maximum precision and reliability ; therefore, professional photographers utilize special mountings of types varying from one manufacturer to another.

SUMMARY OF THE INVENTION

It is the essential object of this invention to provide a camera arrangement permitting the fitting of a wide range of interchangeable lenses and which, while permitting the use of the now conventional "C-Mounting" which may be advantageous in certain cases, even for professional operators, is designed for receiving "-professional" lens mountings ranking among the most popular ones. By the term "professional" lens mountings is meant mountings for lenses of the kind used by professional photographers.

The basic design of this arrangement is based on two principles as follows :

a. The reference face of the C-mounting is spaced 0.69 inch or 17.52 mm from the image plane, in contrast to professional mountings of which the reference faces are spaced at distances corresponding to at least two and even three times this standard distance ; therefore, a sufficient space is available ahead of the reference face of a C-mounting for housing a support for a professional mounting.

b. The C-mounting is too fragile to permit the fitting of relatively heavy professional lenses involving a high fitting moment (notably in the case of zoom or variable-focus lenses) ; however, nothing prevents the provision of an additional mounting support which, while bearing against the reference face of the C-mounting, provides a considerably higher fitting moment.

To achieve the desired result with due consideration for the above remarks, the arrangement according to this invention for mounting interchangeable lenses in a camera provided in the manner known per se with a tapped aperture for securing a C-mounting thereto, is characterized in that said camera further comprises a concentric screw-threaded member of significantly greater diameter, in combination with a support for professional lens mountings, which is adapted to be secured to the camera by screw engagement with said screw-threaded member and to receive professional lens mountings.

BRIEF DESCRIPTION OF THE DRAWING

The attached drawing illustrate diagrammatically by way of example a typical form of embodiment of the present invention. In the drawing :

FIG. 1 is an axial sectional view showing in spaced relationship one portion of the camera structure (right hand portion of the Figure) and a mounting for professional lenses, adapted to be fitted thereto, and FIG. 2 is a view similar to FIG. 1 but showing the mounting assemble with the camera structure and ready to receive professional lenses.

DESCRIPTION OF THE PREFERRED EMBODIMENT

In the drawing , the camera structure or box 1 has secured thereto by means of screw 2 a member 3 for receiving C-mountings and comprising to this end a tapped aperture 4 having a diameter of 1 inch and a pitch of 32 threads per inch.

This member 3 further comprises at its outer periphery having a diameter considerably greater than that of the aforesaid tapped aperture 4 intended for receiving the C-mounting (twice this diameter in the example illustrated) a male screw-threaded portion 5 adapted to receive a corresponding internally threaded fastening ring 6 ; a rigid assembly, comprising a flanged sleeve 7 for mounting interchangeable lenses of any desired type, an intermediate member 8 adapted to slide in smooth frictional engagement in said ring 6 and formed with a shoulder 8a adapted to co-act with a shoulder 6a of ring 6, and a centering and bearing and bearing member 9 comprising a shoulder 9b adapted to engage another shoulder 6b of ring 6, is adapted to pivot about the common axis of ring 6 and member 3, and also to slide axially between end positions set by said shoulders 6a and 6b formed on an inner rib 6c, respectively, said centering and bearing member 9 comprising a centering stud 10 adapted to engage the corresponding bore 11 of a small socket 12 secured for example by means of a screw to the camera structure 1 and to said member 3, in order to ensure the proper angular positioning of the above-mentioned assembly 9, 8 and 7 ; it further comprises a bearing face 13 adapted to engage the bearing face 14 of member 3 when the internally screw-threaded portion 15 of ring 6 is screwed home on the screw-threaded portion 5 of member 3 ; thus, in all cases the reference distance A of C-mountings and B of professional mountings will be strictly adhered to, in relation to the image plane or front face of the photosensitive film shown by a dash line 16 (FIG. 2).

To fit this ring 6 in position, the centering and bearing member 9 is pulled towards the camera, as shown in FIG. 1, so that its stud 10 can easily contact the bearing surface 14 of member 3, before the larger tapping 15 actually engages the first threads of screw-threaded portion 5 of member 3 ; thus, member 9 can pivot about its axis until it is locked in the desired angular position due to the penetration of stud 10 into the bore 11 of socket 12 ; then, the tapping 15 is screwed home on the screw-threaded portion 5 as shown in FIG. 2, until the bearing face 13 of member 9 engages the bearing face 14 of member 3.

Of course, various modifications may be brought to the specific form of embodiment described hereinabove and illustrated in the attached drawing, since the various details given herein are merely illustrative and should not be construed as limiting the invention, within the scope thereof as set forth in the appended claims.

What I claim is

1. In a camera having a case with an opening, a lens mount comprising an annular lens mounting member secured in said opening, said member having an internally threaded lens receiving aperture, an externally threaded outer rim portion and a plane annular reference face between said aperture and rim, a fastening ring having an internally threaded inner end portion mating with said externally threaded outer rim portion and an inwardly projecting rib spaced from said threaded end, an annular intermediate member received in said fastening ring and having a shoulder engageable with said rib, a flanged sleeve member received in said intermediate member and a centering and bearing member secured to an inner end of said intermediate member and having a shoulder engageable with said inwardly projecting rib to retain said fastening ring rotatably on said intermediate member, said fastening ring being screwed onto said externally threaded outer rim portion of said mounting member to press said centering and bearing ring against said plane reference face of said mounting member.

2. A lens mount according to claim 1, in which the diameter of said externally threaded rim portion of said mounting member is approximately twice that of said internally threaded aperture.

3. A lens mount according to claim 1, in which said rim portion of said mounting member comprises a raised annular rim projecting axially outwardly from the plane of said reference face and in which said centering and bearing member has a reduced end portion that fits inside said raised rim to center said centering and bearing member relative to said mounting member.

4. A lens mount according to claim 3, in which said intermediate member has a reduced inner end portion that fits in said reduced inner end portion of said centering and bearing member to center said intermediate member relative to said centering and bearing member.

5. A lens mount according to claim 3, in which said centering and bearing member has an axially projecting stud and said mounting member has a socket receiving said stud to position said centering and bearing member angularly relative to said mounting member.

6. A lens mount according to claim 1, in which said flanged sleeve member has an inwardly extending flange at its inner end and an outwardly projecting flange at its outer end extending out over an outer end portion of said intermediate member and secured thereto.

7. A lens mount according to claim 1, in which the axial distance between said shoulder of said intermediate member and said shoulder of said centering and bearing member is greater than the axial dimension of said inwardly projecting rib of said fastening ring, whereby said fastening ring is slidable axially of said intermediate member within limits set by said shoulders.

* * * * *